United States Patent
Jain et al.

(10) Patent No.: US 7,817,580 B2
(45) Date of Patent: Oct. 19, 2010

(54) PREVENTING TRANSIENT LOOPS IN BROADCAST/MULTICAST TREES DURING DISTRIBUTION OF LINK STATE INFORMATION

(75) Inventors: Sachin Jain, San Jose, CA (US); Ramana Mellacheruvu, San Jose, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 544 days.

(21) Appl. No.: 11/378,990

(22) Filed: Mar. 17, 2006

(65) Prior Publication Data

US 2007/0127396 A1 Jun. 7, 2007

Related U.S. Application Data

(63) Continuation-in-part of application No. 11/297,882, filed on Dec. 7, 2005.

(51) Int. Cl.
*H04L 12/28* (2006.01)
(52) U.S. Cl. .............. 370/254; 370/400; 370/238; 370/338; 370/218
(58) Field of Classification Search ............... 370/254, 370/218, 338, 238
See application file for complete search history.

(56) References Cited

U.S. PATENT DOCUMENTS

| | | | |
|---|---|---|---|
| 5,265,092 A * | 11/1993 | Soloway et al. | 370/238 |
| 5,321,694 A | 6/1994 | Chang et al. | |
| 6,185,203 B1 | 2/2001 | Berman | |
| 6,535,490 B1 * | 3/2003 | Jain | 370/256 |
| 6,628,624 B1 * | 9/2003 | Mahajan et al. | 370/256 |
| 6,845,091 B2 * | 1/2005 | Ogier et al. | 370/338 |
| 6,901,048 B1 | 5/2005 | Wang et al. | |
| 6,917,983 B1 | 7/2005 | Li | |
| 7,406,034 B1 * | 7/2008 | Cometto et al. | 370/218 |
| 2006/0018333 A1 | 1/2006 | Windisch et al. | |
| 2006/0280130 A1 | 12/2006 | Nomura et al. | |
| 2009/0028044 A1 | 1/2009 | Windisch et al. | |

OTHER PUBLICATIONS

Cisco Systems, Inc., Spanning Tree Protocol, Understanding Rapid Spanning Tree Protocol (802.1w), Cisco Doc. ID 24062, Mar. 4, 2005, 9 pages.
Internetworking Technologies Handbook, Third Edition, ISBN: 1-58705-001-3, Chapter 40, pp. 40-1-40-6, 2002.
U.S. Office Action mailed Apr. 9, 2009, U.S. Appl. No. 11/297,882.

(Continued)

*Primary Examiner*—Dang T Ton
*Assistant Examiner*—Pamit Kaur
(74) *Attorney, Agent, or Firm*—Weaver Austin Villenueve & Sampson LLP (57) ABSTRACT

According to the present invention, methods and apparatus are provided to improve the link state routing protocol (LSRP) to prevent transient loops during topology changes. Broadcast and shared multicast traffic may be dropped on particular ports upon detecting link state change until neighboring nodes have computed routes using updated link state information. An acknowledgment is sent upon receiving a link state record. Sync and sync-ack packets are used to determine when link state information is synchronized with that of peer nodes.

25 Claims, 7 Drawing Sheets

OTHER PUBLICATIONS

U.S. Final Office Action mailed May 21, 2009, U.S. Appl. No. 11/297,882.
U.S. Office Action mailed Sep. 28, 2009, U.S. Appl. No. 11/297,882.
U.S. Office Action mailed Aug. 5, 2008, U.S. Appl. No. 11/297,882.
U.S. Final Office Action mailed Dec. 11, 2008, U.S. Appl. No. 11/297,882.
U.S. Advisory Action mailed Jan. 15, 2009, U.S. Appl. No. 11/297,882.

* cited by examiner

PREVENTING TRANSIENT LOOPS IN BROADCAST/MULTICAST TREES DURING DISTRIBUTION OF LINK STATE INFORMATION

RELATED APPLICATION DATA

This application is a continuation-in-part of prior U.S. patent application Ser. No. 11/297,882 entitled "PREVENTING TRANSIENT LOOPS IN BROADCAST/MULTICAST TREES DURING DISTRIBUTION OF LINK STATE INFORMATION" by Jain et al., filed on Dec. 7, 2005, from which benefit is claimed pursuant to the provisions of 35 U.S.C. 120. That application is incorporated herein by reference in its entirety and for all purposes.

BACKGROUND OF THE INVENTION

1. Field of the Invention

The present invention generally relates to the link state routing protocol. More specifically, the present invention provides techniques and mechanisms for improving the link state routing protocol to prevent formation of transient loops.

2. Description of Related Art

Link state routing is a protocol that allows a node in a network to determine network topology by sharing information about transmission cost to each of its neighboring nodes. Link state routing packets are transmitted to neighbors and link state routing packets are received from neighbors. With the shared link state information, the least expensive paths to various destinations can be determined.

In broadcast or shared multicast networks, link state routing allows a network to generate a broadcast or shared multicast tree. However, transient loops can sometimes arise when network topology changes because neighboring nodes may not be forwarding transmissions using the same generated network topology. Some data may be continuously transmitted in loops without ever reaching their assigned destinations. A variety of techniques have been used to address transient loops.

In conventional Internet Protocol networks, time to live (TTL) is a parameter used to drop packets after an expiration time period. If a packet is trapped in a transient loop, the packet is merely dropped after a period of time. However, transient loops in broadcast and multicast traffic cause delivery of multiple copies of the same looped packets to destinations. Furthermore, some fabrics and networks do not use a TTL field.

The Spanning Tree Protocol (802.1d) waits for 15 seconds before forwarding data along a newly generated link to make sure that a change is propagated to the rest of the network during topology changes. However, the traditional spanning tree protocol has slow convergence times. Rapid Spanning Tree (802.1w) uses proposal agreement logic to ensure there are no transient loops. However, Rapid Spanning Tree can be inefficient in certain network topologies such as chain topologies. Furthermore, Rapid Spanning Tree has a well known count to infinity problem.

The Enhanced Interior Gateway Routing Protocol (EIGRP) is a layer 3 distance vector routing protocol that uses dual algorithms to provide that route recomputation occurs in the right order in the network to prevent transient loops. However, EIGRP is limited to layer 3 routing.

U.S. Pat. No. 5,265,092 provides a loop free link state protocol by ensuring that packets are dropped during unsteady state. New packets called ready link state packets (LSP) are used to inform neighbors that a LSR has been used in route computation. Two sets of LSR data are maintained. One is the set of most up to date LSR data and the second is the intelligent set including LSR data not yet committed. Routes are computed based on both the current set and the intelligent set to decide which destination's traffic should be dropped. However, maintenance of both an updated LSR data set and an intelligent LSR data set has extra complexity and overhead.

Current implementations for preventing transient loops using link state routing are limited or are too complicated. Consequently, the techniques of the present invention provide mechanisms for determining transient loop free broadcast and shared multicast trees with simple change to link state routing.

SUMMARY OF THE INVENTION

According to the present invention, methods and apparatus are provided to improve the link state routing protocol (LSRP) to prevent transient loops during topology changes. Broadcast and shared multicast traffic may be dropped on particular ports upon detecting link state change until neighboring nodes have computed routes using updated link state information. An acknowledgment is sent upon receiving a link state record. Sync and sync-ack packets are used to determine when link state information is synchronized with that of peer nodes.

In one embodiment, a technique for distributing link state information is provided. An incoming link state record from a peer node is received at a local node. The incoming link state record including link state information. Outgoing link state records are transmitted on local links associated with the local node. An outgoing link state acknowledgement is transmitted to the peer node. A new broadcast tree is computed using the link state information. Port roles are determined for a plurality of ports associated with the local node. Traffic on selected ports having undergone port role changes is dropped until incoming synchronization acknowledgement packets associated with the selected ports are received.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the link state routing for fibre channel and Data Center Ethernet (DCE). However, it should be noted that the techniques of the present invention can be applied to different variations and flavors of fibre channel and DCE as well as to other networks that use link state routing. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Link state information is used to generate network topology information at various network nodes to create forwarding tables. The forwarding tables allow network nodes such as switches and bridges to forward received traffic on an appropriate output interface. In order to generate a network topology map and a forwarding table at a specific node, link state information is distributed from various network nodes. Each network node can create a link state packet having information about the distance, delay, or cost to each of its neighbors. Distance, delay, or cost all refer to some metric associated with the link between nodes. The link state record (LSR) is then transmitted to neighboring nodes.

When a neighboring node receives a link state record (LSR), the neighboring node extracts information from the LSR and replies with a link state acknowledgment (LSA). A network node receiving link state packets from the other nodes in a network can apply Dijkstra's algorithm to generate a network topology map for building a forwarding table. In conventional link state routing applications, it is possible that network nodes may have inconsistent views of network topology at any given time. One node may have generated a new forwarding table before a neighboring node generates the new table. In one example, a node A may forward to node B using a new forwarding table and a node B simply sends the data back to node A using an old forwarding table. The packet may bounce back and forth until some other event causes the packet to be dropped or B converging to the new forwarding table. In other examples, more involved loops may form after topology changes. Transient loops because of inconsistent network topologies waste network bandwidth and may burden end nodes with duplicate copies.

Consequently, the techniques and mechanisms of the present invention provide network nodes with consistent network topologies and loop free forwarding tables. According to various embodiments, new transmission trees are generated upon receiving a new link state record. New trees are considered rooted at each destination and traffic is dropped for the destination on ports having undergone port role changes or for specific ports depending on whether the cost to root has changed. Drops occur until synchronization is complete.

Freedom from transient loops however is provided at the expense of dropping traffic while routes are converging. The techniques of the present invention recognize that it is beneficial to provide transient loop free mechanisms in certain circumstances such as fibre channel and data center Ethernet (DCE) networks even if a large number of packets must be dropped. Transient loops are particularly harmful to certain network configurations such as layer 2 forwarding configurations. In another embodiment, packets drops are minimized by dropping only if the cost to root changes. In yet another embodiment, packets are dropped only for ports that undergo a role change. Previously, a spanning tree would be required to get a loop free broadcast. However, running an additional spanning tree protocol adds complexity to network management. Furthermore, a spanning tree has several drawbacks include slow convergence time for chain configurations and count to infinity problems.

The techniques of the present invention can also be applied to unicast networks as well as broadcast and shared multicast networks. All unicast routes could be dropped upon receiving an LSR until all outstanding LSAs are received from neighboring nodes. However, it is recognized that using TTL to drop looped packets may be a better choice for unicast than dropping whenever the tree changes because in many cases there will be no loop. For unicast networks, multiple copies of a packet are not generated due to loops so TTL logic has been widely accepted and is typically effective.

Figure 1:
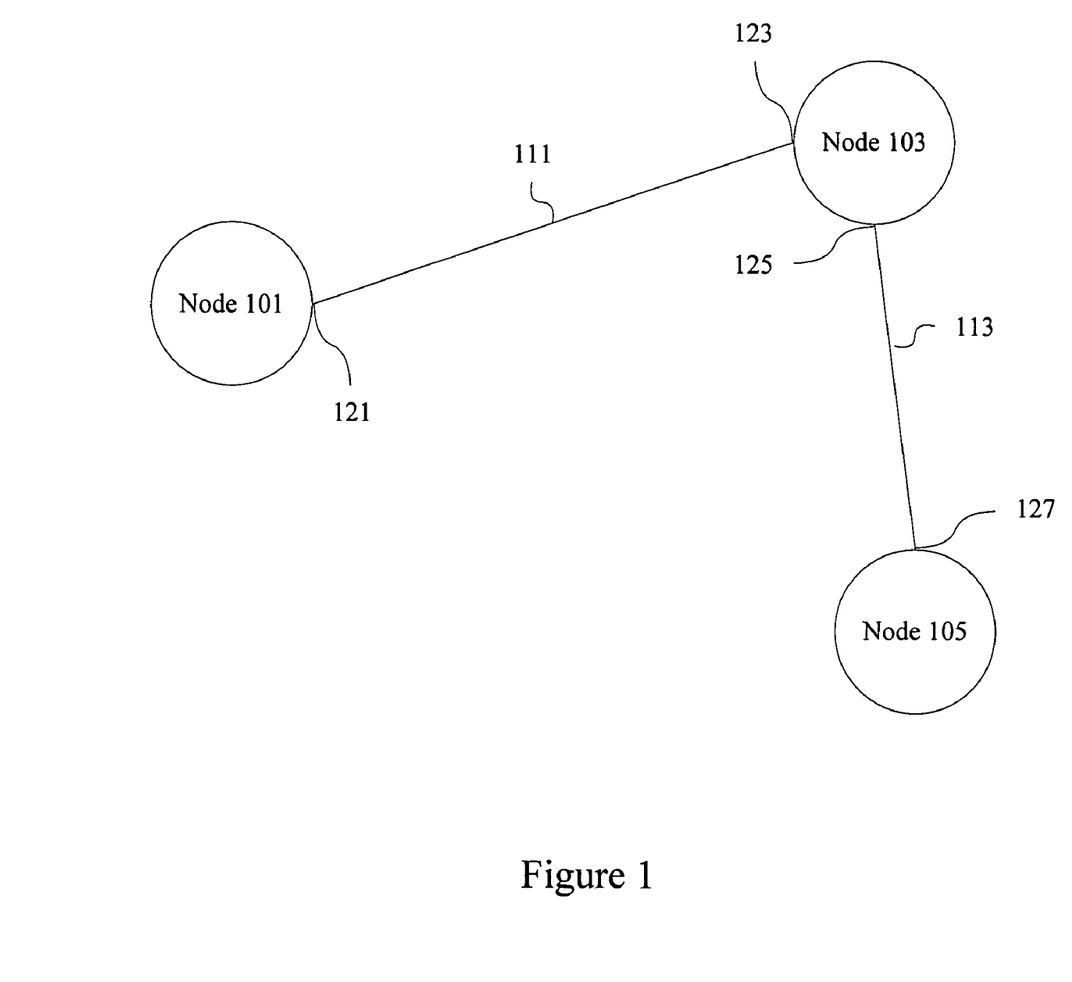
FIG. 1 is a diagrammatic representation showing network nodes that can use the techniques of the present invention.

FIG. 1 is diagrammatic representation showing network nodes that can use the techniques of the present invention. Each network node 101, 103, and 105 represents a network device such as a bridge or a switch used for layer 2 forwarding. According to various embodiments, the network nodes 101, 103, and 105 are nodes in a broadcast or shared multicast network. Root node 101 has designated port 121 connected to child node through link 111 and root port 123. Node 103 has root port 123 and designated port 125. The designated port 125 is connected to child node 105 through link 113 and root port 127.

In broadcast or shared multicast networks, a network node may have a root port connected to a parent node and designated ports connected to child nodes. A network node receives broadcast or shared multicast data on root/designated ports and replicates data on other root/designated ports. The root of the tree can be selected by a unique rule such as node with smallest switch ID.

According to various embodiments, each link is assigned a metric value. The metric value can be a geographic distance, or some function of distance, bandwidth, average traffic, communication cost, delay, or other type of cost. Low assigned costs typically designate preferred links. In this example, the root node is node 101. The broadcast tree is node 101 to node 103 to node 105. Data transmissions are sent from node 101 to node 103 to node 105.

Figure 2:
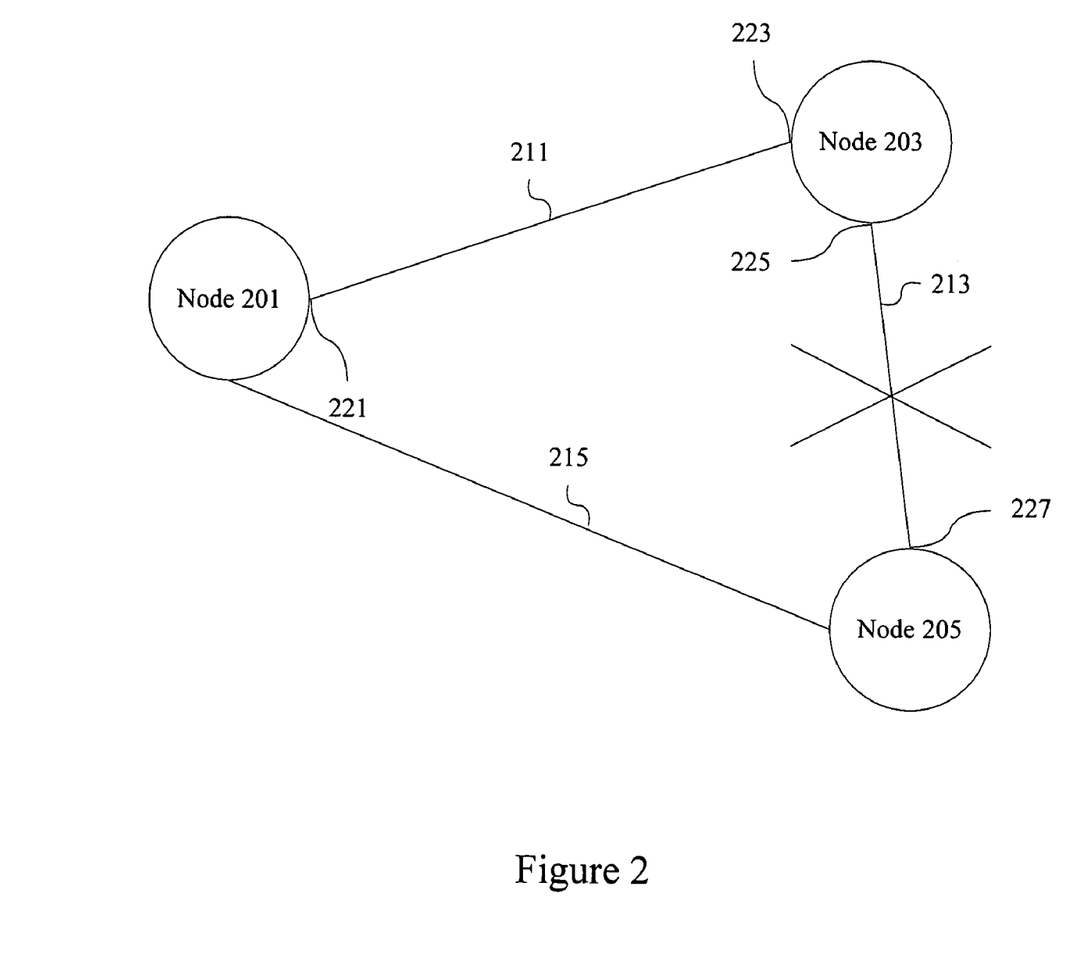
FIG. 2 is a diagrammatic representation showing formation of a transient loop.

FIG. 2 is a diagrammatic representation showing link change. The network includes node 201, node 203, and node 205. Node 201 is connected to node 203 through designated port 221, link 211, and root port 223. Node 203 is connected to node 205 through designated port 225, link 213, and root port 227. According to various embodiments, a new link 215 is added to the network. Based on cost metrics and switch ID numbers, the tree should be node 205 to node 201 to node 203. Link 213 should be unused to avoid a transmission loop. When the new link 215 is added, node 201 generates a new link state record (LSR) after adding the new link.

Using conventional link state routing mechanisms, it is possible that node 205 computes the new broadcast tree before node 203. With inconsistent network topologies used to generate forwarding tables at node 205 and node 203, it is possible that the packet gets looped along node 205 to node 201 to node 203 to node 205 to node 201.

According to various embodiments, the techniques and mechanisms of the present invention allow loop free link changes by providing that neighboring network nodes have a consistent view of network topology before transmitting on the new ports or interfaces. In one embodiment, a link state acknowledgement is sent upon receiving a link state record. A new broadcast tree is generated. Based on characteristics of the new broadcast tree and the old broadcast tree, particular ports may undergo state changes. In another example, if the port role changes, e.g. port role changes to designated, then the port is configured to a drop state. In yet another example, a port is set to drop packets if the port role changes. If root cost increases, all designated ports are set to drop. If root cost decreases, the root ports are set to drop. Consequently, not all ports are required to drop traffic.

Ports remain in the drop state until, there are no link state records which need to be acknowledged between peers, the peer has computed routes based on the new topology database, the peer has computed the routes based on the new topology database, the local switch has no pending Djikstra computation, and the local switch has set the drop/block for ports which should be dropped/blocked as per the most recent Djikstra computation. Sync and sync-ack packets are sent in order to verify consistent topology databases. After sync-ack packets are received, ports are set to no longer drop packets.

In another embodiment, broadcast traffic is dropped at a switch until LSAs are received from neighboring nodes. LSAs are not transmitted from neighboring nodes until the neighboring node completes route computation based on the new LSR. In this embodiment, node 201 detects that a new link 215 is added. Node 201 generates a new LSR having link state information. Link state information may include costs associated with transmitting on links 211 and 215. Node 201 transmits the new LSR to node 203 and node 205. Node 201 computes the new broadcast tree. However, node 201 does not immediately begin to use the new broadcast tree. Node 201 deletes the old broadcast route and blocks broadcast traffic at node 201.

By blocking broadcast traffic at node 201, no traffic is forwarded in a continuous loop. According to various embodiments, node 201 flags the LSR as it has already computed the route. Node 203 gets the new LSR from node 201 and transmits the LSR to node 201 and node 205. Node 203 computes the new tree but again does not immediately begin using the new tree. Instead, node 203 deletes the broadcast route and drops traffic. The loop is now blocked at node 203. When node 203 complete route computation, node 203 sends an LSA to node 201. The LSR associated with node 201 is now flagged in node 203. Node 205 gets the new LSR from node 201 and node 205 computes the new tree. Node 205 deletes the broadcast route and drops broadcast traffic. Node 205 sends an LSA to node 201. The LSR associated with node 201 is now flagged in node 205.

When node 201 receives the LSAs from node 203 and node 205, node 201 programs the new broadcast route. When node 203 receives the LSR from node 205, it recognizes that the LSR is flagged and already used and responds with an LSA immediately. When node 205 receives an LSR from node 203, it recognizes that the LSR is flagged and already used and responds with an LSA immediately. When node 201 receives an LSR from node 203 and node 205, it recognizes that the LSR is flagged and already used and responds with an LSA immediately. When node 203 gets an LSA from node 201 and node 205, node 203 programs the new route and no longer blocks broadcast traffic. The loop now only remains blocked at C. When node 205 receives an LSA from node 203, node 205 programs the new route and stops dropping traffic. Now all nodes have moved to using the new route. No transient loops occurred because before routes were stabilized, some switch was dropping all broadcast traffic.

Figure 3:
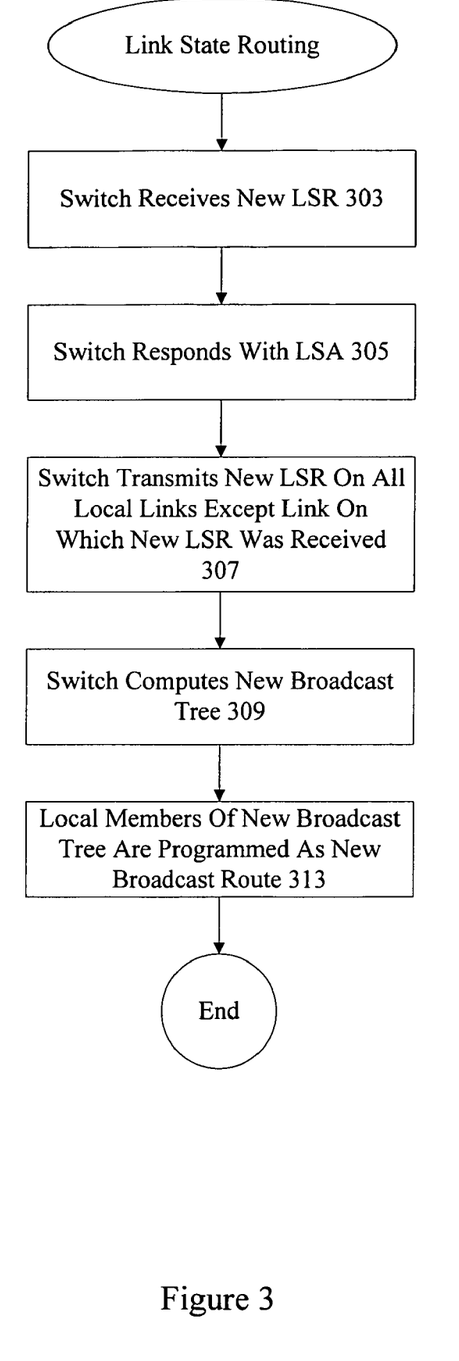
FIG. 3 is a flow process diagram showing a technique for distributing link state information.

FIG. 3 is a flow process diagram showing one technique for distributing conventional link state records. At 303, a node such as a switch receives a new LSR. In conventional implementations, the switch responds with an LSA at 305. The LSA acknowledges the receipt of the LSR. At 307, the switch transmits the new LSR on all local links except the link on which the new LSR was received. For example, if the switch is connected to three other switches in addition to the switch originating the new LSR, the LSR is transmitted to the three neighboring switches. At 309, the switch computes a new broadcast tree. At 313, local members of the new broadcast tree are programmed as the new broadcast route. The switch may compute one or more new forwarding tables during this process.

Figure 4A:
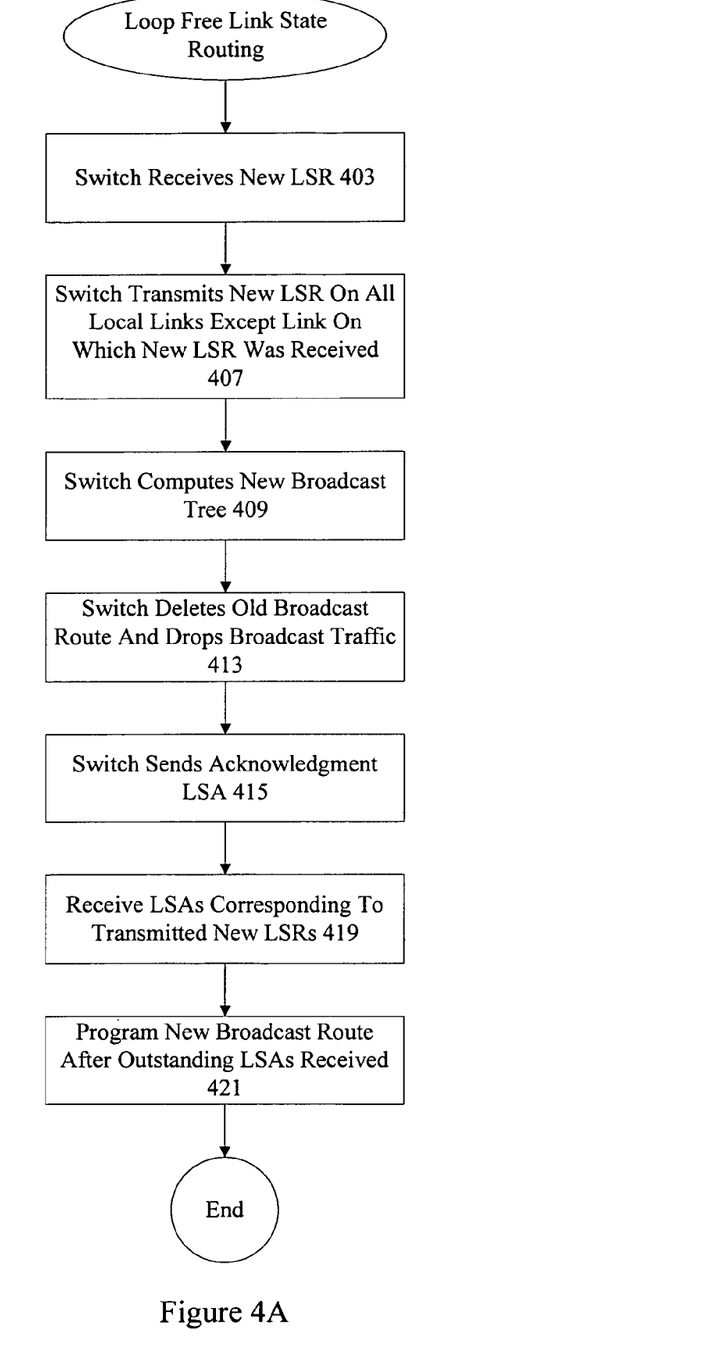
FIG. 4A is a flow process diagram showing another technique for distributing link state information.

FIG. 4A is a flow process diagram showing one technique for managing link state updates while preventing the formation of transient loops. At 403, a switch receives a new LSR. Instead of responding immediately with an LSA, the switch transmits the new LSR on all local links except the link on which the new LSR was received at 407. At 409, the switch computes the new broadcast tree. The switch deletes the old broadcast route and drops broadcast traffic at 413. At this point, unicast traffic may continue to be sent and only broadcast traffic may be dropped. At 415, a switch sends an acknowledgment LSA. The acknowledgment LSA is sent only after the new broadcast tree is generated. At 419, LSAs corresponding to transmitted new LSRs are received at 419. The switch now knows that neighboring switches have completed generation of new broadcast trees using the new LSRs. At 421, the new broadcast route is programmed after outstanding LSAs are received. Broadcast traffic is no longer dropped and is instead forwarded using the new forwarding tables.

No loops occur because in order for a loop to exist, there must be some link in which the two connected switches have different link state information. However, in order for one of the two connected switches to begin transmitting, the neighboring switch must have acknowledged the LSR. The neighboring switch only acknowledges the LSR after the neighboring switch has generated its own updated broadcast tree. Consequently, if two connected switches are both no longer dropping, both have already sent acknowledgments and both have already generated new broadcast trees and forwarding tables.

In another example, an acknowledgment is sent upon receiving a link state update. Particular ports are selected for packet dropping if port role changes for some ports or if the cost to root changes. Sync and sync-ack packets are then exchanged before particular ports are unblocked. No loops occur because for any forwarding port, the cost to root at any node is less than the cost to root at a child. If there is a loop of forwarding ports, the cost to root at any node is less than the cost to root from the next node in the loop. Since the cost can not keep increasing going around a loop, there can not be a loop.

According to various embodiments, the techniques of the present invention can be extended to handle multiple simultaneous changes. In one example, if an LSR is received by a node while it is waiting for some LSA (i.e. broadcast traffic is dropped) the new tree will be computed but there is no need to remove the routes as that is already done. The peer node will send the LSA for the new LSR after computing the new tree. The node programs the new route only after receiving LSA for all the outstanding LSR including this new LSR.

Figure 4B:
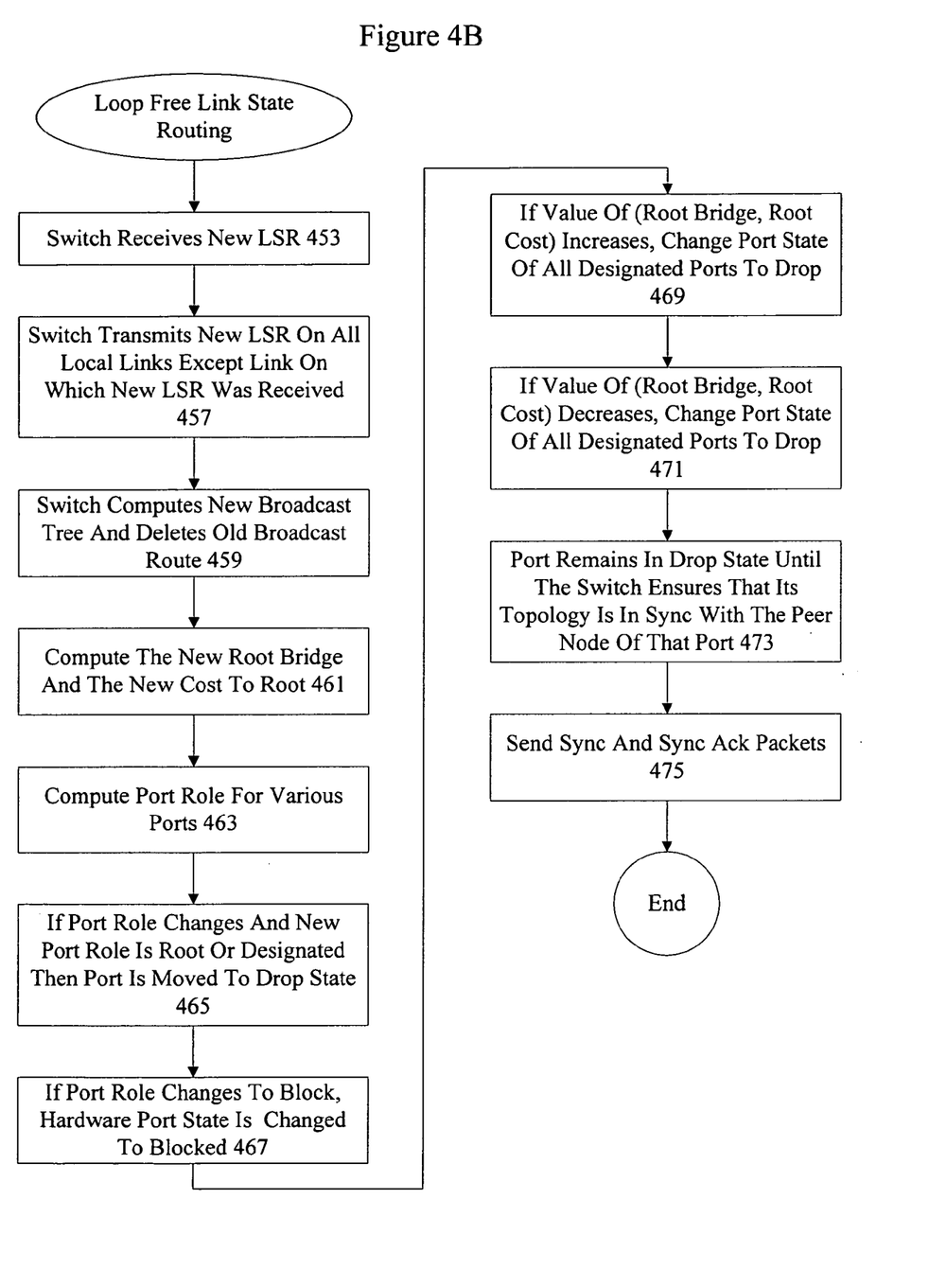
FIG. 4B is a flow process diagram showing yet another technique for distributing link state information.

FIG. 4B is a flow process diagram showing yet another technique for managing link state updates while preventing the formation of transient loops. At 453, a switch receives a new LSR. Instead of responding immediately with an LSA, the switch transmits the new LSR on all local links except the link on which the new LSR was received at 457. At 459, the switch computes the new broadcast tree and deletes the old broadcast route.

At 463, port roles are computed for various ports. Roles include designated, root, etc. If the port role changes at 465 and the new port role is root or designated, the port is moved to a drop state. If the port role changes to block at 467, the hardware port state is changed to blocked. If the value of (root bridge, root cost) increases, the port state of all designated ports is changed to drop. According to various embodiments, the value of (root bridge, root cost) is computed by first comparing the values of root bridge old versus root bridge new. If root bridge old and root bridge new are the same, then the root cost old is compared to root cost new.

At 471, if the value of (root bridge, root cost) decreases, the port state of all designated ports is changed to drop. In another example, if root cost decreases, root ports are placed in a drop state. Ports remain in the drop state until the switch ensures that its topology information is synchronized with peers nodes of the port at 473. The topology information is in sync with peer nodes when all of the following conditions are met:
  i. There are no link state records which need to be acknowledged between peers.
  ii. The peer has computed routes based on the new topology database.
  iii. The peer has computed the routes based on the new topology database.
  iv. The local switch has no pending Djikstra computation.
  v. The local switch has set the drop/block for ports which should be dropped/blocked as per the most recent Djikstra computation.

Sync packets and sync ack packets are used by a node to check that databases are synchronized at 475. If a new link state record is received after sending a sync packet and before receiving sync-ack packet, the sync is sent again with a new incarnation number.

Broadcast traffic is dropped at 463. At this point, unicast traffic may continue to be sent and only broadcast traffic may be dropped. At 465, a switch sends an acknowledgment LSA. The acknowledgment LSA is sent only after the new broadcast tree is generated. At 469, LSAs corresponding to transmitted new LSRs are received at 469. The switch now knows that neighboring switches have completed generation of new broadcast trees using the new LSRs. At 471, the new broadcast route is programmed after outstanding LSAs are received. Broadcast traffic is no longer dropped and is instead forwarded using the new forwarding tables.

No loops occur because in order for a loop to exist, there must be some link in which the two connected switches have different link state information. However, in order for one of the two connected switches to begin transmitting, the neighboring switch must have acknowledged the LSR. The neighboring switch only acknowledges the LSR after the neighboring switch has generated its own updated broadcast tree. Consequently, if two connected switches are both no longer dropping, both have already sent acknowledgments and both have already generated new broadcast trees and forwarding tables.

According to various embodiments, the techniques of the present invention can be extended to handle multiple simultaneous changes. In one example, if an LSR is received by a node while it is waiting for some LSA (i.e. broadcast traffic is dropped) the new tree will be computed but there is no need to remove the routes as that is already done. The peer node will send the LSA for the new LSR after computing the new tree. The node programs the new route only after receiving LSA for all the outstanding LSR including this new LSR.

Figure 5:
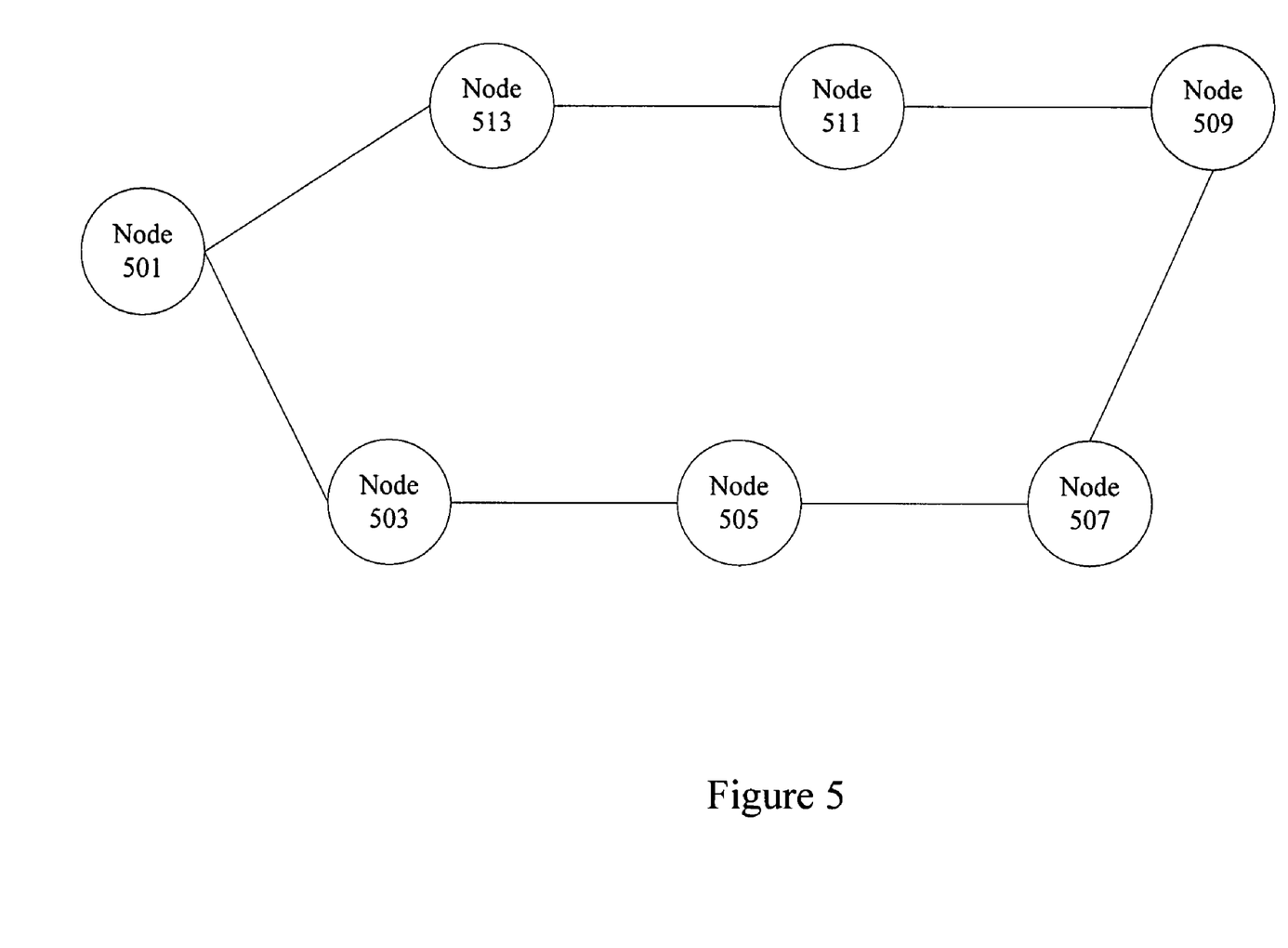
FIG. 5 is a diagrammatic representation showing convergence.

FIG. 5 is a diagrammatic representation showing convergence. According to various embodiments, the convergence time for a topology change is not impacted because of changes LSA transmission. In some embodiments, the LSR is flooded to neighbors as soon as it is received. The only impact is that drops occur while neighbors are computing new broadcast trees. Drops in a switch only occur until the immediate neighboring switches have received the LSR, recomputed the route, initiated packet dropping, and have responded to the sync packet. No end-to-end coordination is needed. If there is a long chain, the drops progress down the chain.

In one example, node 501 is the root. A new link between node 501 and 503 is introduced and the link between node 507 and 509 should no longer be used. Prior to the introduction of the new link, the broadcast tree was node 501-513-511-509-507-505-503. Now based on cost computations, the new tree should be node 507-505-503-501-513-511-509. The link between node 507 and 509 should be unused to prevent looped traffic. Using loop free link state routing computations, link state information can be distributed in the following manner. Node 501 will flood the new LSR to neighboring nodes and begin dropping traffic. Nodes 503 and 513 will get the new LSR and flood LSRs to neighboring nodes and begin dropping traffic. Nodes 503 and 513 will compute a new tree and respond with LSAs to node 501.

When node 501 receives the LSAs, node 501 will no longer drop traffic and dropping occurs at nodes 503 and 513. Nodes 505 and 511 will receive new LSRs and flood LSRs to neighboring nodes and begin dropping traffic. Nodes 505 and 511 will send LSAs to nodes 503 and 513 respectively. Nodes 503 and 513 will stop dropping traffic. The traffic dropping has now progressed to nodes 505 and 511. Eventually, nodes 507 and 509 will move to the new route and will no longer include the link between 507 and 509 in the route. No loop will form.

Figure 6:
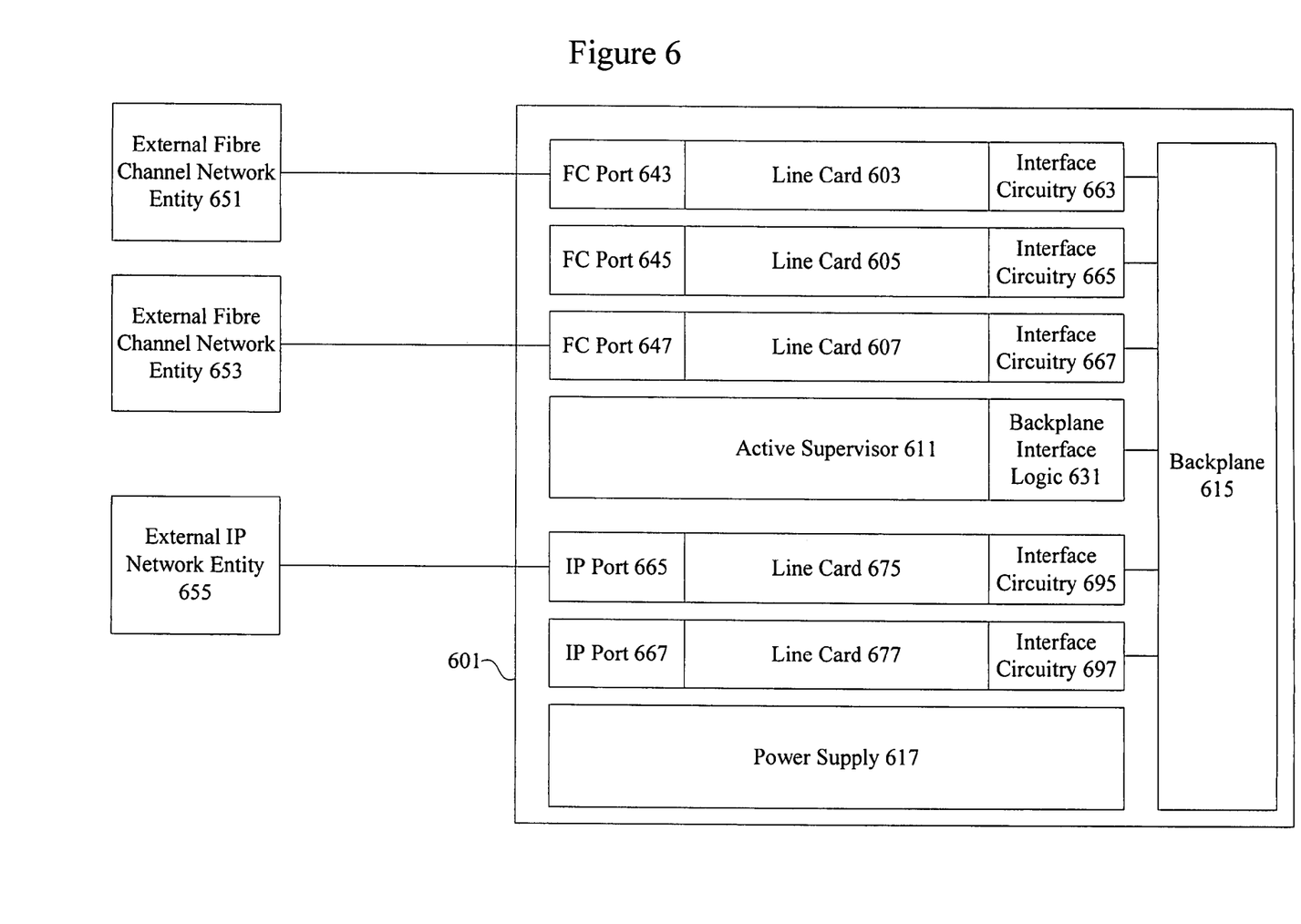
FIG. 6 is a diagrammatic representation of a device that can use the techniques of the present invention.

FIG. 6 is a diagrammatic representation of one example of a fibre channel switch that can be used to implement techniques of the present invention. Although one particular configuration will be described, it should be noted that a wide variety of switches and network devices are available. According to various embodiments, the switch 601 is connected to a Data Center Ethernet (DCE) and a fibre channel fabric. The switch 601 may include one or more supervisors 611. According to various embodiments, the supervisor 611 has its own processor, memory, and storage resources.

Line cards 603, 605, and 607 can communicate with an active supervisor 611 through interface circuitry 683, 685, and 687 and the backplane 615. According to various embodiments, each line card includes a plurality of ports that can act as either input ports or output ports for communication with external fibre channel network entities 651 and 653. The backplane 615 can provide a communications channel for all traffic between line cards and supervisors. Individual line cards 603 and 607 can also be coupled to external fibre channel network entities 651 and 653 through fibre channel ports 643 and 647.

External fibre channel network entities 651 and 653 can be nodes such as other fibre channel switches, disks, RAIDS, tape libraries, or servers. It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications.

According to various embodiments, the switch also includes line cards 675 and 677 with IP interfaces 665 and 667. In one example, the IP port 665 is coupled to an external IP network entity 655. According to various embodiments, each IP line card includes a plurality of ports that can act as either input ports or output ports for communication with external IP entities 655. These IP entities could be IP switches or routers, or directly attached network endnodes. The line cards 675 and 677 can also be coupled to the backplane 615 through interface circuitry 695 and 697.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In another embodiment, a fibre channel switch performs gateway functions between hosts or disks connected to an IP network and host or disks connected to a fibre channel network. In various embodiments, the techniques of the present invention do not need to be implemented by both TCP end points in order to be effective.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for distributing link state information, the method comprising:
    receiving an incoming link state record from a peer node at a local node, the incoming link state record including the link state information;
    transmitting outgoing link state records on local links associated with the local node;
    transmitting an outgoing link state acknowledgement to the peer node;
    computing a new broadcast tree using the link state information;
    determining port roles for a plurality of ports associated with the local node;
    determining root bridge values for the plurality of ports associated with the local node;
    dropping traffic on selected ports having undergone port role changes until incoming synchronization acknowledgement packets associated with the selected ports are received;
    dropping the traffic on the selected ports having increased root bridge values until the incoming synchronization acknowledgement packets associated with the selected ports are received; and
    blocking the traffic on the selected ports having decreased root bridge values until the incoming synchronization acknowledgement packets associated with the selected ports are received.

2. The method of claim 1, further comprising sending outgoing synchronization packets on the selected ports.

3. The method of claim 1, halting the dropping of traffic on the selected ports after the outgoing synchronization packets have been transmitted and the incoming synchronization acknowledgement packets have been received for the selected ports.

4. The method of claim 1, wherein a new synchronization packet having a new incarnation number is sent if an intervening link state record is received.

5. The method of claim 1, further comprising:
    using the new broadcast tree to forward broadcast traffic.

6. The method of claim 1, wherein the outgoing link state acknowledgement transmitted in response to the incoming link state record is transmitted before route computation is performed.

7. The method of claim 1, wherein the local links include designated links.

8. The method of claim 7, wherein the local links include parent links.

9. The method of claim 1, wherein the incoming link state record from the peer node is a link state record packet generated by the peer node to give the link state information about local links associated with the peer node.

10. The method of claim 1, wherein the local node is a fibre channel switch.

11. The method of claim 1, wherein the local node is a network bridge.

12. A system for distributing link state information, the system comprising:
    an input interface operable to receive a link state record from a peer node, the link state record including the link state information;
    an output interface operable to transmit link state records on local links associated with a switch and transmit a link state acknowledgement to the peer node;
    a processor operable to compute a new broadcast tree using the link state information, determine root bridge values for the plurality of ports associated with a local node, and determine port roles for a plurality of ports associated with the switch, wherein the processor is further operable to determine the root bridge values for the plurality of ports associated with the local node;

wherein traffic on selected ports having undergone port role changes is dropped until the synchronization acknowledgement packets associated with the selected ports are received, wherein the traffic on selected ports having increased root bridge values is dropped until the incoming synchronization acknowledgement packets associated with the selected ports are received, and wherein the traffic on selected ports having decreased root bridge values is blocked until the incoming synchronization acknowledgement packets associated with the selected ports are received.

13. The system of claim 12, wherein the output interface is further operable to send synchronization packets on the selected ports.

14. The system of claim 12, halting the dropping of traffic on the selected ports after the synchronization packets have been transmitted and the incoming synchronization acknowledgement packets have been received for the selected ports.

15. The system of claim 12, wherein a new synchronization packet having a new incarnation number is sent if an intervening link state record is received.

16. The system of claim 12, wherein the processor is further operable to use the new broadcast tree to forward broadcast traffic.

17. The system of claim 12, wherein the link state acknowledgment for the link state record is transmitted before route computation is performed.

18. The system of claim 12, wherein the local links include designated links.

19. The system of claim 18, wherein the local links include parent links.

20. The system of claim 12, wherein the link state record from a node is a link state record packet generated by the node to give link state information about local links associated with the node.

21. The system of claim 12, wherein the switch is a fibre channel switch.

22. The system of claim 12, wherein the switch is a network bridge.

23. An apparatus for distributing link state information, the apparatus comprising:

means for receiving an incoming link state record from a peer node, the link state record including the link state information;

means for transmitting outgoing link state records on local links associated with a local node;

means for transmitting an outgoing link state acknowledgement to the peer node;

means for computing a new broadcast tree using the link state information;

means for determining port roles for a plurality of ports associated with the local node;

means for determining root bridge values for the plurality of ports associated with the local node;

means for dropping traffic on selected ports having undergone port role changes until incoming synchronization acknowledgement packets associated with the selected ports are received;

means for dropping the traffic on the selected ports having increased root bridge values until the incoming synchronization acknowledgement packets associated with the selected ports are received; and means for blocking the traffic on the selected ports having decreased root bridge values until the incoming synchronization acknowledgement packets associated with the selected ports are received.

24. The apparatus of claim 23, wherein the apparatus is a fibre channel switch.

25. The apparatus of claim 23, wherein the apparatus is a network bridge.

* * * * *